(12) United States Patent
Anderson et al.

(10) Patent No.: US 6,649,727 B1
(45) Date of Patent: Nov. 18, 2003

(54) AQUEOUS COLLOIDAL DISPERSIONS OF SULFONATED POLYURETHANE UREAS AND PRODUCTS

(75) Inventors: Jeffrey T. Anderson, Lake Elmo, MN (US); Carol-Lynn Spawn, West Lakeland Township, MN (US); Steven T. Hedrick, Lake Elmo, MN (US); Howard S. Creel, Oakdale, MN (US); Steven S. Kantner, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

(21) Appl. No.: 09/626,812

(22) Filed: Jul. 27, 2000

(51) Int. Cl.[7] .................. C08G 18/46; C08G 18/50; C08G 18/28; C08J 3/03; A61K 7/00
(52) U.S. Cl. ................ 528/71; 424/59; 424/61; 424/63; 424/64; 424/69; 424/70.1; 424/70.7; 424/70.11; 424/405; 424/DIG. 10; 428/423.1; 428/319.7; 428/355 N; 428/423.7; 428/424.2; 428/424.6; 428/424.8; 428/425.1; 428/425.5; 428/425.8; 428/425.9; 524/591; 524/839; 524/840; 528/59; 528/76; 528/80; 528/83
(58) Field of Search .................... 524/591, 839, 524/840; 428/423.1, 319.7, 355 N, 423.7, 424.2, 424.6, 424.8, 425.1, 425.5, 425.8, 425.9; 424/59, 61, 63, 64, 69, 70.1, 70.7, 70.11, 405, DIG. 10; 528/59, 71, 76, 80, 83

(56) References Cited

U.S. PATENT DOCUMENTS

| | | | |
|---|---|---|---|
| 2,958,593 A | 11/1960 | Hoover et al. ............... 51/295 |
| 2,988,538 A | 6/1961 | Thoma et al. ................ 528/68 |
| 3,708,333 A | 1/1973 | Carlson ....................... 428/220 |
| 3,826,769 A | 7/1974 | Carlson ....................... 524/591 |
| 3,941,733 A | 3/1976 | Chang ......................... 524/838 |
| 3,971,745 A | 7/1976 | Carlson et al. .............. 523/402 |
| 3,993,614 A | 11/1976 | Carlson ....................... 427/393 |
| 3,998,870 A | 12/1976 | Carlson ....................... 427/337 |
| 3,998,871 A | 12/1976 | Carlson ....................... 156/77 |
| 4,049,396 A | 9/1977 | Hiles ............................ 51/295 |
| 4,108,814 A | 8/1978 | Reiff et al. .................... 528/71 |
| 4,110,284 A | 8/1978 | Violland et al. ............. 528/273 |
| 4,150,946 A | 4/1979 | Neel et al. ................... 528/71 |
| 4,224,418 A | 9/1980 | Dieterich et al. ........... 521/170 |
| 4,227,350 A | 10/1980 | Fitzer ............................ 51/295 |
| 4,307,219 A | 12/1981 | Larson ......................... 528/71 |
| 4,501,852 A | 2/1985 | Markusch et al. .......... 524/591 |
| 4,539,366 A | 9/1985 | Gagne et al. ................ 524/507 |
| 4,558,149 A | 12/1985 | Larson ......................... 528/75 |
| 4,569,982 A | 2/1986 | Grögler et al. .............. 528/73 |
| 4,638,017 A | 1/1987 | Larson et al. ............... 521/157 |
| 4,652,466 A | 3/1987 | Thoma et al. ............... 524/839 |
| 4,696,760 A | 9/1987 | Morimoto et al. .......... 252/314 |
| 4,738,992 A | 4/1988 | Larson et al. ............... 521/157 |
| 4,746,717 A | 5/1988 | Larson ......................... 528/68 |
| 4,774,937 A | 10/1988 | Scholz et al. ............... 128/90 |
| 4,780,523 A | 10/1988 | Chung .......................... 528/76 |
| 4,855,384 A | 8/1989 | Larson ......................... 528/60 |
| 4,856,502 A | 8/1989 | Ersfeld et al. ............... 128/90 |
| 4,922,675 A | 5/1990 | Sato et al. .................... 51/394 |
| 4,937,283 A | 6/1990 | Chung .......................... 524/839 |
| 5,039,733 A | 8/1991 | Dormish et al. ............. 524/591 |
| 5,071,578 A | 12/1991 | Ohkubo et al. .............. 528/71 |
| 5,085,941 A | 2/1992 | Ohkubo ........................ 528/71 |
| 5,110,843 A | 5/1992 | Bries et al. .................. 521/159 |
| 5,118,850 A | 6/1992 | Bowman et al. ............ 564/470 |
| 5,134,035 A | 7/1992 | Kumar et al. ................ 428/694 |
| 5,203,884 A | 4/1993 | Buchanan et al. ........... 51/295 |
| 5,218,072 A | 6/1993 | Kumar et al. ................ 528/59 |
| 5,240,972 A | 8/1993 | Kumar et al. ................ 522/57 |
| 5,244,739 A | 9/1993 | Carlson et al. .............. 428/694 |
| 5,260,136 A | 11/1993 | Ohkubo et al. .............. 428/694 |
| 5,344,873 A | 9/1994 | Blum ............................ 524/591 |
| 5,367,017 A | 11/1994 | Rosthauser et al. ......... 524/589 |
| 5,427,835 A | 6/1995 | Morrison et al. ............ 428/96 |
| 5,468,498 A | 11/1995 | Morrison et al. ............ 524/408 |
| 5,531,039 A | 7/1996 | Gore ............................. 42/101 |
| 5,609,969 A | 3/1997 | Clatanoff et al. ............ 428/632 |
| 5,610,232 A | 3/1997 | Duan et al. .................. 524/840 |
| 5,637,639 A | 6/1997 | Duan et al. .................. 524/591 |
| 5,679,754 A | 10/1997 | Larson et al. ............... 528/28 |
| 5,703,158 A | 12/1997 | Duan et al. .................. 524/840 |

FOREIGN PATENT DOCUMENTS

| | | |
|---|---|---|
| EP | 0 598 312 A2 | 5/1994 |
| EP | 0 794 203 A2 | 9/1997 |
| FR | 2 286 154 | 4/1976 |
| JP | 10-203937 | 8/1998 |
| WO | WO 95/08583 | 3/1995 |
| WO | WO 97/03252 | 1/1997 |
| WO | WO 99/05192 | 2/1999 |

OTHER PUBLICATIONS

"Water–Borne Polyurethane Ionomers", Peter H. Markusch and Robin E. Tirpak, Water–Borne and Higher–Solids Coatings Symposium, Feb. 21–23, 1990, New Orleans, LA, pp. 308–324.

*Primary Examiner*—Rabon Sergent
(74) *Attorney, Agent, or Firm*—Nancy M. Lambert

(57) ABSTRACT

The present invention relates to stable colloidal dispersions of sulfonated polyurethane ureas and self-supporting films formed from these dispersions. After formation of the sulfonated polyurethane urea, alcohols can be added to the aqueous dispersion to provide a water-alcohol system. The films of the present invention are minimally tacky and self-adhesive.

23 Claims, No Drawings

AQUEOUS COLLOIDAL DISPERSIONS OF SULFONATED POLYURETHANE UREAS AND PRODUCTS

FIELD OF THE INVENTION

The present invention relates to stable aqueous colloidal dispersions of sulfonated polyurethane ureas and self-supporting films formed from these dispersions. After formation of the sulfonated polyurethane urea, alcohols can be added to the aqueous dispersion to provide a water-alcohol system. The films of the present invention are minimally tacky and self-adhesive.

BACKGROUND OF THE INVENTION

Polyurethanes are a well-established class of high performance polymers, which can be readily tailored to display unique combinations of tensile strength, toughness, and flexibility. As a result of this versatility, polyurethanes have found utility in a variety of applications including binder resins, abrasion resistant coatings, protective coatings, and membranes.

Polyurethanes may be delivered to a substrate in one of three ways: i) extruded as a melt processable thermoplastic or thermoset material, ii) delivered as a moisture curable or two part curable system, generally from an organic solvent, or iii) delivered as an aqueous dispersion of a colloidal polymer system. Two part polyurethanes are generally used in binder or coating applications where they are delivered either from mixtures of organic solvents, blocked isocyanate terminated compounds, and diamine curatives, or mixtures of organic solvents, a diisocyanate terminated compound and polyols.

Aqueous polyurethane dispersions are utilized when high performance polyurethane properties are required but where volatile organic chemicals are not desirable. They offer advantages in that they have reduced volatile organic compound (VOC) emissions; they may eliminate exposure to toxic isocyanate or diamine compounds during coating; and they provide simplified overall processing. Aqueous polyurethane dispersions have been developed commercially as a means to deliver polyurethane coatings to a wide variety of substrates, including, for example, fibers, textiles, paper, films, wood, and concrete.

WO 99/05192 discloses aqueous colloidal dispersions of sulfopolyureas, comprising a high content of hard segments derived from aromatic diisocyanates, and films formed from these dispersions. The films have improved thermal stability and thus, improved high temperature performance, and may be used to form heat resistant abrasive articles. They are not redispersible in water.

U.S. Pat. No. 4,307,219 describes linear polyurethane resins that are prepared in an inert organic solvent under essentially anhydrous conditions and that once coated and dried, can be redispersed in water and aqueous organic solvents.

U.S. Pat. No. 4,738,992 describes a water-absorbing sponge comprising at least one of a pendant sulfo-group containing polyurea and polyurethane. The sponge comprises the reaction product of an isocyanate-terminated sulfopolyurethane/urea, a polyisocyanate, an isocyanate-terminated polyurethane/urea, and a compound selected from the group consisting of water and a polyol or polyamine plus a blowing agent.

None of the technologies discussed above provide a polyurethane dispersion capable of forming self-supporting films that are minimally tacky and self-adhesive, nor do they suggest the use of these materials in cosmetic formulations.

Therefore, a need exists in the art for a polyurethane dispersion stable in water and water-alcohol solvent systems, where the dispersion has one or more of the following properties: minimal tack and high self-adhesion, capable of forming stable dispersions in water and water-alcohol systems, and capable of rapidly forming films on skin or hair by simple ambient evaporation.

SUMMARY OF THE INVENTION

The present invention relates to stable aqueous colloidal dispersions of sulfonated polyurethane ureas and films formed from these dispersions.

In brief summary, sulfonated polyurethane ureas of the present invention comprise the reaction product of:
  (a) one or more sulfonated polyols;
  (b) one or more non-sulfonated polyols;
  (c) one or more aliphatic polyisocyanates, having 2 to 25 carbon atoms, or cycloaliphatic polyisocyanates, having 3 to 25 carbon atoms; and
  (d) excess water,
    wherein the reaction product of (a), (b), and (c) with (d) comprises a polyurea segment of the following formula:

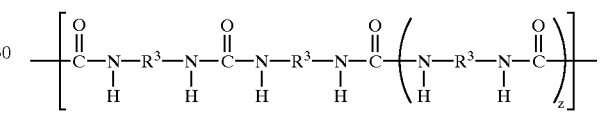

wherein z is an integer from 0 to 6 and $R^3$ is an aliphatic group, having 2 to 25 carbon atoms, or a cycloaliphatic group, having 3 to 25 carbon atoms, derived from the aliphatic or cycloaliphatic polyisocyanate. The reaction of (a), (b), and (c) forms an isocyanate terminated prepolymer mixture that has an isocyanate to hydroxyl ratio of 1.3 to 2.5:1. Excess water means that the water is in an amount greater than the amount of isocyanate terminated prepolymer mixture (w/w) such that a final aqueous dispersion of less than 50% solids is achieved. The reaction product of (a), (b) and (c) with (d) provides a sulfonated polyurethane urea that has a sulfonate equivalent weight of from about 1000 to about 8500 and that has been chain-extended only with water.

Another aspect of the present invention relates to stable aqueous dispersions prepared from the sulfonated polyurethane ureas described above.

An additional aspect of the present invention relates to self-supporting films prepared from the sulfonated polyurethane ureas described above. These films are formed with no volatile organic compound emissions and with no post-coating chemical or ionic cross-linking; therefore, the overall processing to form the films is simplified into one step. The films of the present invention are minimally tacky and self-adhesive. Some films of the present invention can also be redispersible in water.

GLOSSARY

In this application:
  "Aliphatic" means a non-aromatic group, which can be a straight or branched chain alkylene group of 2 to 25 carbon atoms wherein these groups may be optionally substituted, for example, with ether, ester, or cycloaliphatic functional groups.

"Colloidal dispersion" means a discrete distribution of particles having an average size of less than about 1 micron, typically less than about 500 nanometers, in an aqueous media (water) or in a water-alcohol media.

"Cohesive" means having auto-adhesion or self-adhesion, i.e., the capability of adhering to itself.

"Cycloaliphatic" means a non-aromatic, optionally substituted cyclic group of 3 to 25 carbons, wherein one to three carbon atoms may be optionally replaced with a heteroatom, for example, nitrogen or oxygen, or C(O). The cycloaliphatic group may be optionally substituted, for example, with alkyl, ether, or ester functional groups.

"Minimally tacky" means having a relatively low degree of tack, preferably non-tacky. Therefore, minimally tacky includes compositions that are tack free; very, very, low tack; very low tack, and low tack when tested by a "finger appeal" test. The finger appeal test involves qualitatively assessing an adhesive by a light touch and short contact time at room temperature (about 20° to 30° C.) and assigning a value of 1 through 5, where 1=tack free, 1.25=very, very, low tack, 1.5=very low tack, 2=low tack, 2.5=low-to-medium tack, 3=medium tack, 3.5=medium-to-good tack, 4=good tack, and 5=excellent tack. On this scale, Scotch™ Magic™ transparent tape from Minnesota Mining and Manufacturing Co. (3M), St. Paul, Minn., USA has a rating of 5.

"Polyurea" means a polymer obtained by a polymerization reaction in which the mechanism of chain growth is entirely the formation of urea and biuret linkages by the reaction of isocyanate groups with amine or urea groups, with urea linkage formation predominating.

"Self-adhesion" means a material preferentially adheres to itself or a chemically similar material under pressure or force without the need for significantly elevated temperatures (e.g., without the need for temperatures above about 50° C.). Preferred compositions of the invention exhibit self-adhesion properties immediately upon contact to itself at room temperature (about 20° to 30° C.). As used in the previous sentence, the term "immediately" means less than a few minutes, e.g., about 5 minutes, preferably less than 1 minute, more preferably less than 30 seconds, depending on the application.

"Stable aqueous colloidal dispersion" means a uniform dispersion of polymer particles having an average diameter of from about 10 nanometers to about 1 micron in water, which do not agglomerate in the absence of agitation (either continuous or intermittent).

"Sulfonate equivalent weight" means the sum of the atomic weights of all of the atoms in the sulfopolyurea divided by the number of sulfonate groups contained in the polymer molecule.

"Sulfopolyurea" means a high molecular weight polyurea containing at least one sulfonate group covalently bonded to and pendant from the polymer chain.

"Sulfonated polyurethane urea" refers to a polymer containing sulfonate groups and a plurality of urea linkages and urethane linkages.

DETAILED DESCRIPTION OF THE ILLUSTRATIVE EMBODIMENTS OF INVENTION

The sulfonated polyurethane ureas of the present invention comprise the reaction product of: (a) one or more sulfonated polyols, (b) one or more non-sulfonated polyols, (c) one or more aliphatic or cycloaliphatic polyisocyanates, and (d) excess water, wherein the reaction product of (a), (b), and (c) with (d) comprises a polyurea segment of the following formula:

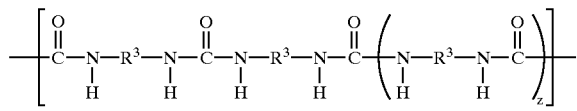

wherein z is an integer from 0 to 6 and $R^3$ is an aliphatic group, having 2 to 25 carbon atoms, or a cycloaliphatic group, having 3 to 25 carbon atoms, derived from the aliphatic or cycloaliphatic polyisocyanate. The reaction of (a), (b), and (c) forms an isocyanate terminated prepolymer mixture that has an isocyanate to hydroxyl ratio (NCO/OH) of 1.3 to 2.5:1. The reaction product of (a), (b) and (c) with (d) provides a sulfonated polyurethane urea that has a sulfonate equivalent weight of from about 1000 to about 8500 and that has been chain-extended only with water.

Polyols

The term "polyol" as used herein refers to polyhydric alcohols comprising two or more hydroxyl groups. The polyols can be hydrophilic or hydrophobic. The term "polyol" as used herein includes non-sulfonated polyols and non-sulfonated polyols used in the preparation of sulfonated polyols. A non-sulfonated polyol is a polyol that does not contain a sulfonate group pendant from the polyol backbone.

A preferred class of polyols suitable for use in the present invention includes polyols having molecular weights in the range of from about 200 to about 2000. Preferably, the polyols contain divalent aliphatic or cycloaliphatic groups containing ether or ester functional groups. Also, mixtures of polyols can be used.

Polyols suitable for use in the present invention can be selected from the group consisting of polyether polyols, polyester polyols, polycaprolactone polyols, polytetramethylene glycols, and the like, and mixtures thereof. Additionally, polyester diols made from diesters, diacids, and diols may be utilized. Diesters and diacids useful for making polyester diols include, but are not limited to, dimethyl isophthalate, dimethyl terephthalate, and dimethyl adipate, and the like; diols useful for making polyester diols include propylene glycol, 1,3-propane diol, 1,4-butane diol, and the like.

Polyols of the present invention include, but not limited to, polyethylene glycols and polypropylene glycols. In addition, polyols of the present invention include, but are not limited to, diethylene glycol/adipic acid polyester polyol (Lexorez™ 1100–220, available from Inolex Chemical Company, Philadelphia, Pa.); neopentyl glycol, 1,6-hexanediol, isophthalate, adipate polyester polyol (Fomrez™ 8056–146, available from Witco Corp., New York, N.Y.); 400 average molecular weight polyethylene glycol (available from DuPont Chemicals, Wilmington, Del.), 600 average molecular weight polyethylene glycol (available from Union Carbide Chemical and Plastics Co., Inc., Danbury, Conn.); 1000 average molecular weight polypropylene glycol (available from Arco Chemical, Newton Square, Pa.), 1000 average molecular weight polyethylene glycol (available from Union Carbide Chemical and Plastics Co., Inc., Danbury, Conn.); 3400 average molecular weight polyethylene glycol (available from Aldrich Chemical Company, Milwaukee, Wis.) and polycaprolactone diol (Tone™-200, available from Union Carbide Corp.).

Sulfonated Polyols

A sulfonated polyol is a polyol that contains at least one sulfonate group ($SO_3M$ where M is a cation selected from the group consisting of the alkali metal cations $Na^+$, $Li^+$, and $K^+$) pendant from the polyol backbone. Sulfonated polyols can be made from non-sulfonated polyols by a transesterification or esterification reaction.

A preferred class of sulfonated polyols are prepared under typical transesterification or esterification reaction conditions, using one or more of the polyols indicated above, other diols, or combinations of the polyols and other diols with dimethyl-5-sodiosulfoisophthalate (DMSSIP CAS #3965-55-7, commercially available from Aldrich Chemical Company, Milwaukee, Wis.) or 5-sodiosulfoisophthalic acid (SSIP CAS #6362-79-4, commercially available from Aldrich Chemical Company, Milwaukee, Wis.), and a transesterification reaction catalyst (for example, tetrabutyl titanate, commercially available from Aldrich Chemical Company, Milwaukee, Wis.). Typically an excess of the polyol (up to as much as a 4:1 molar excess polyol relative to dimethyl-5-sodiosulfoisophthalate) is used in the formation of the sulfonated polyol. When the reaction is complete, the product is a mixture of sulfonated polyols and non-sulfonated polyols.

A variety of polyols may be utilized. Polyols of the present invention include, but not limited to, 400 average molecular weight polyethylene glycol (available from DuPont Chemicals, Wilmington, Del.), 600 average molecular weight polyethylene glycol (available from Union Carbide Chemical and Plastics Co., Inc., Danbury, Conn.), 425 average molecular weight polypropylene glycol (available from Arco Chemical, Newton Square, Pa.), and 300 average molecular weight polyethylene glycol (available from Aldrich Chemical Company, Milwaukee, Wis.). Also mixtures of polyols can be used. A preferred polyol is a mixture of polyethylene glycol with a hydroxy equivalent weight of 200 and polypropylene glycol with a hydroxy equivalent weight of 212. The result of reaction of about 4 equivalents of the polyol mixture above per equivalent of DMSSIP produces a sulfonated polyol having a hydroxy equivalent weight of about 300 and a centrally located aromatic sulfonate group.

Other polyols that may be reacted with DMSSIP, in order to provide a sulfonated polyol useful in the present invention, include polycaprolactone polyols. Additionally, dimethyl-5-sodiosulfoisophthalate or 5-sodiosulfoisophthalic acid may be utilized with other diesters of diacids, including dimethyl isophthalate, dimethyl terephthalate and dimethyl adipate, and diols to produce co-polyester diols containing sulfonate. Examples of such diols include propylene glycol; 1,3-propane diol; 1,4-butane diol; 1,5-pentane diol; 1,6-hexane diol; neopentyl glycol; diethylene glycol; dipropylene glycol; 2,2,4-trimethyl- 1,3 pentane diol; 1,4-cyclohexanedimethanol; ethylene oxide and/or propylene oxide adduct of bisphenol A; ethylene oxide and/or propylene oxide adduct of hydrogenated bisphenol A; polyethylene glycol and polypropylene glycol.

Polyisocyanates

Polyisocyanates used in the preparation of the sulfonated polyurethane ureas of the present invention are aliphatic or cycloaliphatic polyisocyanates and mixtures thereof. A wide variety of aliphatic and cycloaliphatic polyisocyanates may be utilized. Polyisocyanates of the present invention are any aliphatic and/or cycloaliphatic organic compounds that have two or more reactive isocyanate (i.e. —NCO) groups in a single molecule. This definition includes diisocyanates, triisocyanates, tetraisocyanates, etc., and mixtures thereof. A particularly well-known and useful class of polyisocyanates are diisocyanates.

Suitable polyisocyanates include, but are not limited to, isophorone diisocyanate, (IPDI), commercially available from Bayer Corp., Pittsburgh, Pa. as Desmodur™ I, bis(4-isocyanatocyclohexyl)methane ($H_{12}MDI$), commercially available from Bayer Corp. as Desmodur™ W, trimethyl-1, 6-diisocyanatohexane (TMDI, available from Aldrich Chemical Company, Milwaukee, Wis.; (CAS #34992-02-4)), 1,6-diisocyanatohexane (HDI, available from Aldrich Chemical Company, Milwaukee, Wis.(CAS #822-06-0)), and mixtures thereof.

Excess water means that the water is in an amount greater than the amount of isocyanate terminated prepolymer mixture (w/w) such that a final aqueous dispersion of less than 50% solids is achieved. Water is also used to chain extend the prepolymer mixture.

In the sulfonated polyurethane urea of the present invention, at least one sulfonate group ($SO_3M$) is pendant from the sulfonated polyurethane urea backbone. Preferably the $SO_3M$ group is pendant from an aromatic moiety incorporated into the sulfonated polyurethane urea. The sulfonate group within the polyurethane urea backbone is derived from the sulfonated polyol described above. The sulfonated polyurethane urea has a sulfonate group equivalent weight of from about 1000 to 8500, preferably about 3000 to 6000.

The sulfonated polyurethane urea polymer backbone is a polymer that contains a plurality of urethane segments and a plurality of urea segments. The urethane segments are derived from the reaction of sulfonated polyols, non-sulfonated polyols and aliphatic and/or cycloaliphatic polyisocyanates to form an isocyanate terminated prepolymer mixture. The urea segments of the polymer are derived from the reaction of the isocyanate terminated prepolymer mixture with water.

The amount of urea segments to urethane segments in the sulfonated polyurethane urea is critical in determining the physical properties of a film formed from the aqueous dispersions of sulfonated polyurethane ureas of the present invention. The urea segments reduce tackiness of the sulfonated polyurethane urea, and the urethane segments promote self-adhesion. Therefore, to achieve a minimally tacky, self-adhesive film, the amount of urea segments to urethane segments must be properly balanced.

The amount of urea segments to urethane segments arises from the isocyanate to hydroxyl ratio (NCO/OH) of the isocyanate terminated prepolymer, a higher ratio indicating more free isocyanate. Therefore, the isocyanate to hydroxyl ratio (NCO/OH) of the isocyanate terminated prepolymer mixture ultimately determines the molecular weight and physical properties of the sulfonated polyurethane urea generated. Preferably a NCO/OH ratio of about 1.3 to 2.5:1, more preferably about 1.65 to 1.85:1, and most preferably about 1.75:1, is used to generate an isocyanate terminated prepolymer average molecular weight of about 700 to 2500, more preferably about 1200 to 1700. If the average molecular weight of the isocyanate terminated prepolymer mixture is too high, the prepolymer mixture becomes too viscous; therefore, this molecular weight range is preferred.

When the NCO/OH ratio is about 1.3 to 2.5:1, the resulting sulfonated polyurethane ureas have a combination of urea and urethane segments such that films formed from the dispersions of sulfonated polyurethane ureas are surprisingly self-supporting, minimally tacky, and self-adhesive, i.e. the film has a minimally tacky feel when touched, and at the same time has the capability to adhere to itself. In addition, these films can also be water-redispersible. When the NCO/OH ratio is about 1.65 to 1.85:1 and more preferably about 1.75:1, the amount of urea segments to urethane segments in the sulfonated polyurethane urea is even more evenly balanced to provide a film that is minimally tacky and self-adhesive.

When the ratio NCO/OH is too high, the resulting sulfonated polyurethane urea has too many urea segments and too few urethane segments and a film formed from an aqueous dispersion of sulfonated polyurethane urea will tend to not have self-adhesive properties. Furthermore, it has been discovered that when the NCO/OH ratio is too low, the resulting sulfonated polyurethane urea has too many urethane groups and too few urea groups, and a film formed from a dispersion of sulfonated polyurethane urea will tend to be tacky when touched and not self-supporting.

Preparation of the sulfonated polyurethane ureas of the present invention is schematically depicted in the following Scheme A:

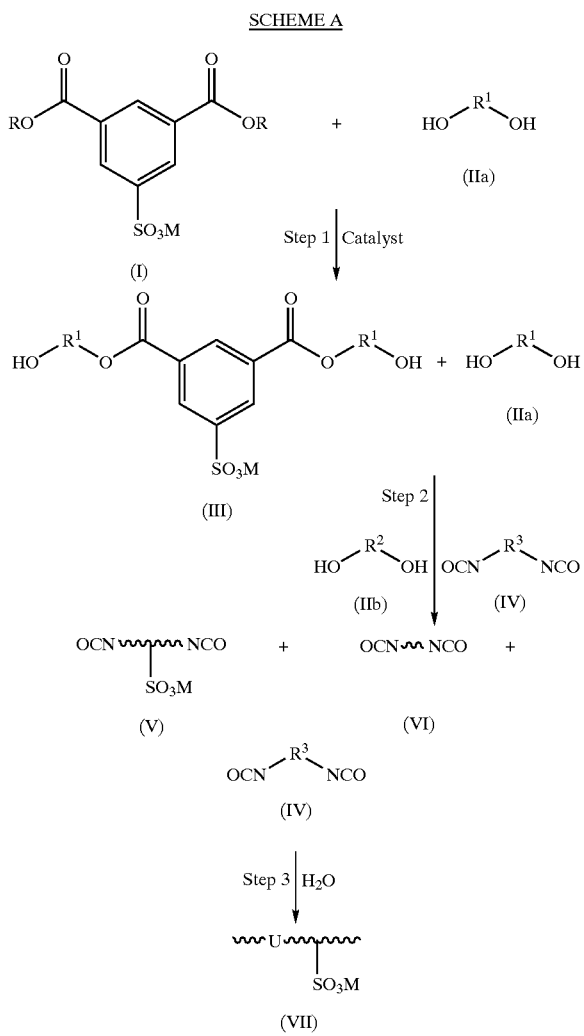

In Step 1 of Scheme A, a transesterification or esterification reaction is performed in which a compound of formula (I), wherein R is H or $CH_3$, is reacted with a polyol (IIa) in the presence of a catalyst. Within the polyol (IIa), $R^1$ is a divalent aliphatic group having an average molecular weight of 200 to 2000 comprising ether or ester functional groups. This reaction provides a sulfonated polyol (III) and unreacted/excess polyol (IIa). Suitable catalysts include, for example, tetrabutyl titanate (TBT), zinc chloride, sodium alkoxides, cadmium acetate, and lead acetate. The transesterification or esterification reaction is performed at approximately 170° C. Polyol (IIa) may be a single polyol or a mixture of polyols, producing a single sulfonated polyol (III) or a mixture of sulfonated polyols (III).

In Step 2, sulfonated polyol (III), polyol (IIa), and optionally polyol (IIb) are reacted with polyisocyanate (IV). Within the polyisocyanate (IV), $R^3$ is as defined previously, and within the polyol (IIb), $R^2$ is a divalent aliphatic group or cycloaliphatic group having a molecular weight of 200 to 2,000 comprising ether or ester functional groups. This reaction provides isocyanate terminated prepolymer (V) and (VI) and unreacted/excess polyisocyanate (IV). In this Step additional polyol (IIa) and/or a different polyol (IIb) may be added. Polyol (IIa) and (IIb) may be a single polyol or a mixture of polyols and polyisocyanate (IV) may be a single polyisocyanate or a mixture of polyisocyanates. The isocyanate terminated prepolymer (V) and (VI) is comprised of the reaction products of polyisocyanate (IV) with any one or combination of sulfonated polyol (III), polyol (IIa) and polyol (IIb). Therefore, the end-product of Step 2 comprises an isocyanate terminated prepolymer mixture that is a mixture of isocyanate terminated sulfonated prepolymer (V), isocyanate terminated prepolymer (VI), and excess polyisocyanate (IV). The isocyanate terminated sulfonated prepolymer (V) produced by the above described process is described in U.S. Pat. Nos. 4,558,149, 4,746,717, and 4,855,384, which are incorporated herein by reference in their entirety.

In Step 3, the isocyanate terminated prepolymer mixture, [(V), (VI) and (IV)], is mixed with excess water pre-heated to approximately 50–65° C. with sufficient agitation to avoid macroscopic gel formulation. This addition produces an aqueous colloidal dispersion of sulfonated polyurethane urea (VII). Excess water means that the amount of water is greater than the amount of isocyanate terminated prepolymer mixture (w/w). Within the sulfonated polyurethane urea (VII), U is a polyurea segment of the following formula:

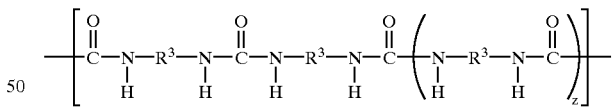

wherein $R^3$ is derived from the polyisocyanate (IV) and is as defined previously and z is as defined previously.

The reaction may be stirred at approximately 75° C. for 1–3 hours. Mixing methods may be employed that provide adequate levels of shear or agitation in order to avoid formation of macroscopic gel particles.

Chain extension is accomplished with water only; chain extension with a diamine ($H_2N\sim NH_2$) does not provide minimally tacky, self-adhesive properties. Co-solvents, such as volatile organic compounds, are not required. Therefore, exposure to and disposal of potentially harmful volatile organic chemicals can be eliminated.

Subsequent to being introduced into the aqueous environment, a portion of the isocyanate groups react with water to form amino groups and $CO_2$. These amino groups spontaneously react with another isocyanate group to form urea linkages in the sulfonated polyurethane ureas.

This process produces a discreet aqueous distribution or aqueous dispersion of sulfonated polyurethane urea particles less than one micron in diameter, typically ranging from about 10 nanometers to about 500 nanometers in diameter. The dispersions can have a translucent, bluish appearance characteristic of a colloidal dispersion or can range from a clear light yellow solution to a milky white dispersion. The particles have sufficient hydrophilicity imparted to them by the pendant sulfonate groups that the dispersion displays good stability, showing substantially no agglomeration in the absence of stirring or agitation under extended storage at ambient conditions without supplemental surfactants. Supplemental surfactants do not need to be added to the dispersions to facilitate wetting various substrates. Therefore, the dispersions of the present invention contain no additives to affect dispersion stability.

Free standing or self-supporting films are readily prepared from the aqueous colloidal dispersions by removing water from the composition and allowing the films to dry. Conventional spin casting or film coating techniques can be utilized to form these films. Organic co-solvents are not required to facilitate film formation and/or wetting of substrates. Although co-solvents are not required, as one skilled in the art would understand, alcohols can be added to the aqueous dispersion after formation of the sulfonated polyurethane urea to provide a water-alcohol system. A water-alcohol system may be preferred in certain applications to provide, for example, faster drying time, and in other applications an aqueous system may be preferred to provide, for example, essentially no volatile organic compound (VOC) emissions. After drying free-standing or self-supporting films are formed. These films are minimally tacky and self-adhesive. In addition, some of the films can be redispersed in water.

The colloidal dispersions of sulfonated polyurethane ureas and films of the present invention may be used in a variety of applications including, for example, cohesive tapes, sealing materials, nonwoven binder, fluorochemical flexibilizers/softener, ink receptive coatings, polyolefin primer, and cosmetic applications. The sulfonated polyurethane ureas and films formed therefrom may be used in any application where a minimally tacky, self-adhering material is desirable. In addition, some of the films of the present invention are also water redispersible; therefore, they may be used in any application where a minimally tacky, self-adhering and water redispersible material is desired, including for example, water-soluble adhesives.

In addition, the inventive composition and films formed therefrom are useful in cosmetic applications. Such applications require some amount of water resistance, transfer resistance, or substantivity to skin, nails or hair. The applications include, e.g., makeup cosmetic or protective cosmetic applications such as mascara, foundation, rouge, face powder, eyeliner, eyeshadow, insect repellent, nail polish, skin moisturizer, skin cream and body lotion, lipstick, and sunscreen.

When the inventive dispersion is used in hair care products, such as shampoos and conditioners and the like, the dispersion can provide faster drying. It can also improve the humidity resistance of hair styling agents when used at low levels in combination with other hair styling resins. The hair care products, as described herein, are not "reshapable" hair styling compositions. "Reshapable" hair styling composition means a hair styling composition providing hair styling that can be restored or modified without new material or heat being applied. For example, in order to restore or modify the hairstyle in case of "drooping" or loss of setting (dishevelment), no new materials, such as water or any form of fixing agent, or heat are required. The composition can be long lasting, such as 10–24 hours, giving rise to a durable styling effect.

The dispersions and films of the present invention may be coated upon a variety of flexible and inflexible substrates using conventional coating techniques to produce sheet materials coated with a sulfonated polyurethane urea film. Flexible substrates are defined herein as any material which is conventionally utilized as a tape backing or may be of any other flexible material. Illustrative examples include, but are not limited to, paper, plastic films such as polypropylene, polyethylene, polyvinyl chloride, polyester (polyethylene terephthalate), polycarbonate, poly(methyl methacrylate) (PMMA), cellulose acetate, cellulose triacetate, and ethyl cellulose. Additionally, flexible substrates include, but are not limited to, woven fabric formed of threads of synthetic or natural materials such as cotton, wool, nylon, rayon, glass, or ceramic material, or they may be nonwoven fabric such as air-laid webs of natural or synthetic fibers or blends of these. Illustrative examples of inflexible substrates include, but are not limited to, metal, metallized polymeric film, or ceramic sheet material. The dispersions and films can also be applied to fibrous substrates of synthetic or natural materials, such as keratin and collagen.

The coated sheet materials may take the form of any article conventionally known to be utilized with minimally tacky, self-adhesive compositions such as labels, tapes, signs, covers, marking indices, and the like.

EXAMPLES

The present invention will be further illustrated, but not limited by, the following examples and evaluations. All parts, percentages, and ratios are by weight unless otherwise specified.

The following Table I is a compilation of the materials used in these experiments.

TABLE I

| Name or Acronym | Chemical Name | Source |
|---|---|---|
| Lexorez ™ 1100-220 | Diethylene glycol/adipic acid polyester polyol | Inolex Chemical Company Philadelphia, PA |
| Fomrez ™ 8056-146 | Neopentyl glycol, 1,6-hexanediol, isophthalate, adipate polyester polyol | Witco Corp. New York, NY & Houston, TX |
| PEG-1000 | Carbowax ™ Polyethylene glycol - 1000 | Union Carbide Corp. Danbury, CT |
| PEG-600 | Polyethylene glycol - 600 | Aldrich Chemical Company Milwaukee, WI |
| PEG-400 | Polyethylene glycol - 400 | Aldrich Chemical Company Milwaukee, WI |
| PEG-300 | Polyethylene glycol - 300 | Aldrich Chemical Company Milwaukee, WI |
| PEG-3400 | Polyethylene glycol - 3400 | Aldrich Chemical Company Milwaukee, WI |
| PPG-425 | Arcol ™ PPG-425 (Polypropylene glycol - 425) | ARCO Chemical Company Newtown Square, PA |
| PPG-1000 | Arcol ™ PPG-1000 (Polypropylene glycol - 1000) | ARCO Chemical Company Newtown Square, PA |
| PPG-1025 | Arcol ™ PPG-1025 (Polypropylene glycol - 1025) | ARCO Chemical Company Newtown Square, PA |
| Tone ™ 0210 | Tone ™ 0210 Polycaprolactone diol | Union Carbide Corp. Danbury, CT |

TABLE I-continued

| Name or Acronym | Chemical Name | Source |
|---|---|---|
| IPDI | Desmodur ™ I (Isophorone Diisocyanate) CAS# 4098-71-9 | Bayer Corporation Pittsburgh, PA |
| $H_{12}$MDI | Desmodur ™ W (bis(4-isocyanato-cyclohexyl)-methane) CAS# 5124-30-1 | Bayer Corporation Pittsburgh, PA |
| MDI | Mondur ™ M (Diphenyl-methane diisocyanate) CAS# 101-68-8 | Bayer Corporation Pittsburgh, PA |
| Isonate ™ 2143L | Aromatic Diisocyanate | Dow Chemical Corporation Midland, MI |
| DBTDL | Dibutyltin dilaurate CAS# 77-58-7 | Aldrich Chemical Company Milwaukee, WI |
| ESA | Ethanesulfonic acid ($C_2H_5SO_3H$) CAS# 594-45-6 | Aldrich Chemical Company Milwaukee, WI |
| Dytek ™ A | 5-methyl-1,5-pentane-diamine CAS# 15520-10-2 | Aldrich Chemical Company Milwaukee, WI |
| EDA | Ethylene diamine CAS# 107-15-3 | Aldrich Chemical Company Milwaukee, WI |
| DMSSIP | dimethyl-5-sodiosulfo-isophthalate CAS# 3965-55-7 | Aldrich Chemical Company, (Milwaukee, WI) |
| TBTN | Tetrabutyl titanate CAS# 5593-70-4 | Aldrich Chemical Company Milwaukee, WI |

I. Preparation of Sulfopolyester Polyols

Preparation A

A 5 liter reaction vessel was charged with 4100 g polyethylene glycol-600 (13.67 equivalents) and 505.67 g dimethyl-5-sodiosulfoisophthalate (DMSSIP) (3.42 equivalents). The materials were dried under full vacuum at 100° C. for 1 hour. Tetrabutyl titanate (0.08 wt %) was subsequently added and the reaction was heated at 220° C. until approximately 85% of the theoretical methanol had been removed. The reaction temperature was reduced to 170° C. and held under vacuum for 1 hour resulting in a clear light yellow material. Calculated hydroxyl equivalent weight was 428, calculated sulfonate equivalent weight was 2632.

Preparation B

This material was prepared as preparation A above using the following materials: 1000 g polyethylene glycol-400 (5.0 equivalents), 1000 g polypropylene glycol-425 (4.7 equivalents), 359.5 g dimethyl-5-sodiosulfoisophthalate (2.43 equivalents) and 0.08 wt % tetrabutyl titanate. The product was a clear light yellow material. Calculated hydroxyl equivalent weight was 295, calculated sulfonate equivalent weight was 1879.

Preparation C

This material was prepared as preparation A above using the following materials: 3000.0 g polyethylene glycol-400 (15.0 equivalents), 555.0 g dimethyl-5-sodiosulfoisophthalate (3.75 equivalents) and 0.08 wt % tetrabutyl titanate. Drying was done at 65° C. The product was a clear light yellow material. Calculated hydroxyl equivalent weight was 305, calculated sulfonate equivalent weight was 1832.

Preparation D

This material was prepared as preparation A above using the following materials: 1404.0 g polypropylene glycol-425 (6.623 equivalents), 245.04 g dimethyl-5-sodiosulfoisophthalate (1.656 equivalents) and 0.08 wt % tetrabutyl titanate. Drying was done at 105° C. under full vacuum for 30 minutes. The reaction was heated to 245° C. followed by cooling to 145° C. then holding at 170° C. for 3 hours under full vacuum. The product was a clear yellow material. Calculated hydroxyl equivalent weight was 311, calculated sulfonate equivalent weight was 1928.

Preparation E

A 500-milliliter reaction vessel was charged with 300.0 g polyethylene glycol-300 (2.0 equivalents) and 74.0 g dimethyl-5-sodiosulfoisophthalate (0.50 equivalents). The materials were dried under full vacuum at 110° C. for 30 minutes. Nitrogen was used to release vacuum and tetrabutyl titanate (0.08 wt %) was subsequently added and the reaction was heated at 220° C. under nitrogen until approximately 85% of the theoretical methanol had been removed. The reaction temperature was reduced to 128° C. and vacuum was pulled to 0.9 mm. The reaction was heated to 170° C. held under vacuum for 1.5 hour resulting in a clear light yellow material. Calculated hydroxyl equivalent weight was 228, calculated sulfonate equivalent weight was 1432.

Preparation F

A 500-milliliter reaction vessel was charged with 225.0 g polyethylene glycol-400 (1.125 equivalents), 83.25 g dimethyl-5-sodiosulfoisophthalate (0.563 equivalents) and 1.3 g tetrabutyl titanate (0.08 wt %). The reaction was heated at 220° C. for 2 hours under nitrogen removing 15 g of methanol. The reaction temperature was reduced to 175° C. and vacuum was pulled to 1 mm. The reaction was maintained at 175° C. under vacuum for 1 hour resulting in a clear light yellow material. Calculated hydroxyl equivalent weight was 516, calculated sulfonate equivalent weight was 1032.

II. Sulfonated Polyurethane Ureas

Example 1

To a 3 liter three neck round bottom flask, 355.0 g preparation B sulfopolyester polyol (1.145 equivalents) and 360.0 g Fomrez™ 8056-146 (0.916 equivalents) were charged and dried by heating under full vacuum. After cooling to 25° C. and repressurizing with nitrogen, 1.6 g ethanesulfonic acid (0.151 equivalents), 400.4 g isophorone diisocyanate (3.607 equivalents) and 0.02 wt % dibutyltin dilaurate were added and the reaction mixture heated to 50° C. Following a 37° C. exotherm, the reaction was maintained at approximately 75° C. for 2.5 hours.

A 12-liter reaction vessel was charged with 2088 g water and heated to 60° C. The prepolymer prepared above was slowly (but continuously) added to the water over a 10–15 minute period forming a milky dispersion. The reaction was heated at 60–80° C. for two hours. This resulted in a stable dispersion having 36% solids.

Example 2

To a 2-liter, three-neck, round-bottom flask, 693.0 g preparation B sulfopolyester polyol (2.214 equivalents) and 265.5 g polypropylene glycol-1000 (0.518 equivalents) were charged and dried by heating under full vacuum. After cooling to 25° C. and repressurizing with nitrogen, 3.12 g ethanesulfonic acid (0.3 equivalents), 530.7 g isophorone diisocyanate (4.78 equivalents) and 0.02 wt % dibutyltin dilaurate were added and the reaction mixture heated to 50° C. Following a 30° C. exotherm, the reaction was maintained at approximately 75° C. for 1 hours.

A 12-liter reaction vessel was charged with 2800 g water and heated to 60° C. The prepolymer prepared above was slowly (but continuously) added to the water over a 1 hour period (keeping foaming to a minimum) forming a bluish milky dispersion. Following the addition, the reaction was heated at 75° C. for one hour. This resulted in a stable dispersion having 28.9% solids.

Example 3

To a 500 milliliter three neck round bottom flask, 45.0 g preparation C sulfopolyester polyol (0.153 equivalents), 15 g preparation D sulfopolyester polyol (0.048 equivalents), 10.0 g Lexorez™ 1100-220 (0.039 equivalents) and 10.0 g Fomrez™ 8056-146 (0.025 equivalents) were charged and dried by heating under full vacuum. After cooling to 25° C. and repressurizing with nitrogen, 0.20 g ethanesulfonic acid (0.019 equivalents), 51.56 g isophorone diisocyanate (0.465 equivalents) and 0.02 wt % dibutyltin dilaurate were added and the reaction mixture heated to 50° C. Following a 65° C. exotherm, the reaction was maintained at approximately 75° C. for 1 hour.

A 2-liter reaction vessel was charged with 310.0 g water and heated to 65° C. The prepolymer prepared above was slowly (but continuously) added to the water over a 15 minute period (keeping foaming to a minimum) forming a bluish milky dispersion. Following the addition, the reaction was heated at 75° C. for 75 minutes. This resulted in a stable dispersion having 25.7% solids.

Example 4

To a 500 milliliter three neck round bottom flask, 25.0 g preparation B sulfopolyester polyol (0.081 equivalents), 25.0 g preparation A sulfopolyester polyol (0.059 equivalents), 20.0 g Tone™ 0210 (0.048 equivalents) were charged and dried by heating under full vacuum. After cooling to 25° C. and repressurizing with nitrogen, 0.113 g ethanesulfonic acid (0.011 equivalents), 43.0 g Desmodur™ (0.328 equivalents) and 0.02 wt % dibutyltin dilaurate were added and the reaction mixture heated to 75° C. No exotherm was observed. The reaction was maintained at approximately 75° C. for 1 hour.

Another reaction vessel was charged with 265 g water and heated to 75° C. The prepolymer prepared above was slowly (but continuously) added to the water over a 10–15 minute period forming a milky dispersion. The reaction was heated at 75° C. for 75 minutes. This resulted in a stable dispersion having 22.4% solids.

Example 5

To a 500 milliliter three neck round bottom flask, 40.0 g preparation B sulfopolyester polyol (0.129 equivalents), 35.0 g preparation A sulfopolyester polyol (0.082 equivalents), 18.0 g Tone™ 0210 (0.043 equivalents) were charged and dried by heating under full vacuum. After cooling to 25° C. and repressurizing with nitrogen, 0.180 g ethanesulfonic acid (0.017 equivalents), 49.7 g isophorone diisocyanate (0.448 equivalents) and 0.02 wt % dibutyltin dilaurate were added and the reaction mixture heated to 62° C. Following a 26° C. exotherm, the reaction was maintained at approximately 75° C. for 1 hour.

Another reaction vessel was charged with 345 g water and heated to 75° C. The prepolymer prepared above was slowly (but continuously) added to the water over a 10–15 minute period forming a milky dispersion. The reaction was maintained at 75° C. for 75 minutes. This resulted in a stable dispersion having 18.4% solids.

Example 6

To a 1000 milliliter three neck round bottom flask, 95.0 g preparation B sulfopolyester polyol (0.306 equivalents), 95.0 g preparation A sulfopolyester polyol (0.224 equivalents), 40.0 g Lexorez™ 1100-220 (0.157 equivalents) and 40 g Fomrez™ 8056-146 (0.102 equivalents) were charged and dried by heating under full vacuum. After cooling to 25° C. and repressurizing with nitrogen, 0.428 g ethanesulfonic acid (0.040 equivalents), 153.19 g isophorone diisocyanate (1.380 equivalents) and 0.02 wt % dibutyltin dilaurate were added and the reaction mixture gently heated to 60° C. Following a 27° C. exotherm, the reaction was maintained at approximately 75° C. for 1 hour.

Another reaction vessel was charged with 2014 g water and heated to 75° C. The prepolymer prepared above was slowly (but continuously) added to the water over a 10-minute period forming a milky dispersion. The reaction was maintained at 75° C. for 80 minutes. This resulted in a stable dispersion having 19.1% solids.

Example 7

To a 500 milliliter three neck round bottom flask, 22.0 g preparation B sulfopolyester polyol (0.071 equivalents), 22.0 g preparation F sulfopolyester polyol (0.045 equivalents), 10.0 g Lexorez™ 1100-220 (0.039 equivalents) and 10 g Fomrez™ 8056-146 (0.025 equivalents) were charged and dried by heating under full vacuum. After cooling to 25° C. and repressurizing with nitrogen, 0.099 g ethanesulfonic acid (0.009 equivalents), 35.18 g isophorone diisocyanate (0.317 equivalents) and 0.02 wt % dibutyltin dilaurate were added and the reaction mixture was gently heated to 60° C. Following a 34° C. exotherm, the reaction was maintained at 77° C. for 1 hour.

Another reaction vessel was charged with 245 g water and heated to 75° C. The prepolymer prepared above was slowly (but continuously) added to the water over a 10-minute period forming a milky dispersion. The reaction was maintained at 75° C. for 85 minutes. This resulted in a stable dispersion having 25.4% solids.

Example 8

To a 500 milliliter three neck round bottom flask, 30.0 g preparation C sulfopolyester polyol (0.102 equivalents), 30.0 g preparation D sulfopolyester polyol (0.096 equivalents), 10.0 g Lexorez™ 1100-220 (0.039 equivalents) and 10 g Fomrez™ 8056-146 (0.025 equivalents) were charged and dried by heating under full vacuum. After cooling to 25° C. and repressurizing with nitrogen, 0.135 g ethanesulfonic acid (0.013 equivalents), 51.05 g isophorone diisocyanate (0.460 equivalents) and 0.02 wt % dibutyltin dilaurate were added and the reaction mixture was gently heated to 75° C. Following a 9.3° C. exotherm, the reaction was maintained at approximately 75° C. for 1 hour.

Another reaction vessel was charged with 306 g water and heated to 70° C. The prepolymer prepared above was slowly (but continuously) added to the water over a 10-minute period forming a bluish dispersion. The reaction was maintained at 80° C. for 75 minutes. This resulted in a stable dispersion having 35.2% solids.

Example 9

To a 500 milliliter three neck round bottom flask, 30.0 g preparation E sulfopolyester polyol (0.132 equivalents), 7.5 g Lexorez™ 1100-220 (0.029 equivalents) and 24.0 g Fomrez™ 8056-146 (0.061 equivalents) were charged and dried by heating under full vacuum. After cooling to 25° C. and repressurizing with nitrogen, 0.135 g ethanesulfonic acid (0.013 equivalents), 43.13 g isophorone diisocyanate (0.389 equivalents) and 0.02 wt % dibutyltin dilaurate were added and the reaction mixture was gently heated to 52° C. Following a 42° C. exotherm, the reaction was maintained at approximately 75° C. for 75 minutes.

Another reaction vessel was charged with 250 g water and heated to 65° C. The prepolymer prepared above was slowly (but continuously) added to the water over a 10-minute period forming a milky dispersion. The reaction was maintained at 78° C. for one hour. This resulted in a stable dispersion having 32.75% solids.

Example 10

To a 500 milliliter three neck round bottom flask, 29.76 g preparation B sulfopolyester polyol (0.096 equivalents) and 29.76 g preparation A sulfopolyester polyol (0.070 equivalents) and 23.8 g Fomrez™ 8056-146 (0.061 equivalents) were charged and dried by heating under full vacuum. After cooling to 25° C. and repressurizing with nitrogen, 0.134 g ethanesulfonic acid (0.013 equivalents), 44.0 g isophorone diisocyanate (0.397 equivalents) and 0.02 wt % dibutyltin dilaurate were added and the reaction mixture was gently heated to 50° C. Following a 53° C. exotherm, the reaction was maintained at approximately 75° C. for 1 hour.

Another reaction vessel was charged with 305 g water and heated to 70° C. The prepolymer prepared above was slowly (but continuously) added to the water over a 15-minute period forming a milky dispersion. The reaction was maintained at 75° C. for one hour. This formed a stable dispersion having 27.4% solids.

Example 11

To a 500 milliliter three neck round bottom flask, 25.0 g preparation B sulfopolyester polyol (0.081 equivalents), 25.0 g preparation A sulfopolyester polyol (0.059 equivalents) and 20 g Fomrez™ 8056-146 (0.051 equivalents) were charged and dried by heating under full vacuum. After cooling to 25° C. and repressurizing with nitrogen, 0.113 g ethanesulfonic acid (0.011 equivalents), 43.6 g Desmodur™ W (0.333 equivalents) and 0.02 wt % dibutyltin dilaurate were added and the reaction mixture was gently heated to 50° C. Following a 68.6° C. exotherm, the reaction was maintained at approximately 75° C. for 1 hour.

Another reaction vessel was charged with 280 g water and heated to 65° C. The prepolymer prepared above was slowly (but continuously) added to the water over a 10-minute period resulting in an almost clear dispersion. The reaction was heated at 82° C. for one hour. The resulting dispersion had 23.65% solids.

Example 12

To a 500 milliliter three neck round bottom flask, 20.0 g preparation D sulfopolyester polyol (0.064 equivalents) and 55.0 g preparation C sulfopolyester polyol (0.186 equivalents), 18.0 g Tone™ 0210 (0.043 equivalents) and 5.0 g polyethylene glycol-3400 (0.003 equivalents) were charged and dried by heating under full vacuum. After cooling to 25° C. and repressurizing with nitrogen, 0.090 g ethanesulfonic acid (0.009 equivalents), 57.7 g isophorone diisocyanate (0.520 equivalents) and 0.02 wt % dibutyltin dilaurate were added and the reaction mixture was gently heated to 50° C. Following a 70° C. exotherm, the reaction was maintained at approximately 75° C. for 1 hour.

Another reaction vessel was charged with 380 g water and heated to 65° C. The prepolymer prepared above was slowly (but continuously) added to the water over a 10-minute period forming a milky dispersion. The reaction was maintained at 75° C. for three hours. The resulting stable dispersion had 22.5% solids.

Example 13

To a 500 milliliter three neck round bottom flask, 40.0 g preparation D sulfopolyester polyol (0.129 equivalents), 40.0 g polyethylene glycol-1000 (0.080 equivalents) and 10.0 g Fomrez™ 8056-146 (0.025 equivalents) were charged and dried by heating under full vacuum. After cooling to 25° C. and repressurizing with nitrogen, 0.180 g ethanesulfonic acid (0.017 equivalents), 45.47 g isophorone diisocyanate (0.410 equivalents) and 0.02 wt % dibutyltin dilaurate were added and the reaction mixture was gently heated to 50° C. Following a 46.3° C. exotherm, the reaction was maintained at approximately 75° C. for 1 hour.

Another reaction vessel was charged with 325 g water and heated to 65° C. The prepolymer prepared above was slowly (but continuously) added to the water over a 10-minute period forming a milky dispersion. The reaction was maintained at 75° C. for one hour. The reaction mixture was diluted with water to afford a clear light yellow-green dispersion having 14.7% solids.

Comparative Example 1
Aromatic Diisocyanate 446.35 g MDI (3.570 equivalents) and 1.89 g ethanesulfonic acid (0.178 equivalents) were charged to a 2 liter reaction vessel, melted and mixed. A predried mixture of 420.0 g preparation B sulfopolyester polyol (1.342 equivalents), 205.0 g polypropylene glycol-1025 (0.400 equivalents) and 0.02 wt % dibutyltin dilaurate were added to the diisocyanate over 30 minutes maintaining the temperature below 60° C. during the addition. The reaction was subsequently heated to 75° C. and a 10° C. exotherm was observed. The reaction was maintained at approximately 75° C. for 1 hour.

3222 g water was charged to another reaction vessel and heated to 75° C. The prepolymer prepared above was slowly added to the water over a 30 minute period (keeping foaming to a minimum) forming a bluish milky dispersion. Following the addition, the reaction was maintained at 75° C. for 75 minutes. The resulting stable dispersion had 22.7% solids.

Comparative Example 2
Aromatic Diisocyanate

To a 2 liter three neck round bottom flask, 529.0 g preparation A sulfopolyester polyol (1.242 equivalents) and 205.3 g polypropylene glycol-1025 (0.402 equivalents) were charged and dried by heating under fall vacuum. After cooling to 25° C. and repressurizing with nitrogen, 2.4 g ethanesulfonic acid (0.224 equivalents), 489.05 g Isonate# 2134L (3.375 equivalents) and 0.02 wt % dibutyltin dilaurate were added and the reaction mixture was subsequently heated to 50° C. Following a 61.5° C. exotherm, the reaction was maintained at approximately 75° C. for 90 minutes.

2972 g water was charged to another reaction vessel and heated to 65° C. The prepolymer prepared above was slowly added to the water over a 30 minute period (keeping foaming to a minimum) forming a milky dispersion. Following the addition, the reaction was maintained at 75° C. for one hour. Residual coagulation was filtered. The resulting stable dispersion had 24.2% solids.

Comparative Example 3
Diamine Chain Extension

To a 1 liter three neck round bottom flask, 168.3 g preparation B sulfopolyester polyol (0.538 equivalents) and 82.0 g polypropylene glycol-1025 (0.160 equivalents) were charged and dried by heating under full vacuum. After cooling to 25° C. and repressurizing with nitrogen, 0.757 g ethanesulfonic acid (0.072 equivalents), 135.52 g isophorone diisocyanate (1.221 equivalents) and 0.02 wt % dibutyltin dilaurate were added and the reaction mixture was subsequently heated to 50° C. Following a 25° C. exotherm, the reaction was maintained at approximately 75° C. for 90 minutes. The reaction was shut down overnight then reheated to 80° C. the next day. Following a 32° C. exotherm, the reaction was maintained at approximately 75° C. for 1 hour.

A reaction vessel was charged with 137.68 g water and 2.8 g ethylene diamine (0.0933 equivalents) and heated to 50° C. Prewarmed prepolymer prepared above (71.8 g) was slowly (but continuously) added to the aqueous amine solution over a 10-minute period forming a bluish then milky dispersion. Following the addition, the reaction was heated at 70° C. for 30 minutes. The resulting stable dispersion had 26.0% solids.

Comparative Example 4
Diamine Chain Extension

To a 1 liter three neck round bottom flask, 168.3 g preparation B sulfopolyester polyol (0.538 equivalents) and 82.0 g polypropylene glycol-1025 (0.160 equivalents) were charged and dried by heating under full vacuum. After cooling to 25° C. and repressurizing with nitrogen, 0.757 g ethanesulfonic acid (0.072 equivalents), 135.52 g isophorone diisocyanate (1.221 equivalents) and 0.02 wt % dibutyltin dilaurate were added and the reaction mixture was subsequently heated to 50° C. Following a 25° C. exotherm, the reaction was maintained at approximately 75° C. for 90 minutes. The reaction was shut down overnight then reheated to 80° C. the next day. Following a 32° C. exotherm, the reaction was maintained at approximately 75° C. for 1 hour.

A reaction vessel was charged with 193.8 g water and 7.4 g Dytek™ A (0.128 equivalents) and heated to 50° C. 99.21 g prewarmed prepolymer prepared above was slowly added to the aqueous amine solution over a 10-minute period forming a bluish then milky dispersion. Following the addition, the reaction was heated at 70° C. for 30 minutes. The resulting stable dispersion had 29.0% solids.

Comparative Example 5
1.1:1 NCO/OH Ratio

To a 500 milliliter three neck round bottom flask, 42.0 g preparation B sulfopolyester polyol (0.134 equivalents), 20.5 g PPG-1000 (0.040 equivalents) were charged and dried by heating under full vacuum. After cooling to 25° C. and repressurizing with nitrogen, 0.19 g ethanesulfonic acid (0.0175 equivalents), 21.3 g isophorone diisocyanate (0.193 equivalents) and 0.02 wt % dibutyltin dilaurate were added and the reaction mixture heated to 50° C. Following a 37° C. exotherm, the reaction was maintained at approximately 75° C. for 1 hour resulting in a very viscous material. To aid in the transfer of this prepolymer, 50 g butanone was added to the prepolymer just prior to water chain extension.

Another reaction vessel was charged with 265 g water and heated to 60° C. The prepolymer prepared above was slowly (but continuously) added to the water over a 5-minute period resulting in an almost clear dispersion. The reaction was heated at 80° C. for 60 minutes. This resulted in a stable dispersion having 26.7% solids.

Comparative Example 6
2.6:1 NCO/OH Ratio

To a 500 milliliter three neck round bottom flask, 42.0 g preparation B sulfopolyester polyol (0.134 equivalents), 20.5 g PPG-1000 (0.040 equivalents) were charged and dried by heating under full vacuum. After cooling to 25° C. and repressurizing with nitrogen, 0.19 g ethanesulfonic acid (0.0175 equivalents), 50.3 g isophorone diisocyanate (0.453 equivalents) and 0.02 wt % dibutyltin dilaurate were added and the reaction mixture heated to 50° C. Following a 35° C. exotherm, the reaction was maintained at approximately 75° C. for 2 hours.

Another reaction vessel was charged with 352.3 g water and heated to 60° C. The prepolymer prepared above was slowly (but continuously) added to the water over a 5-minute period resulting in a milky dispersion. The reaction was heated at 75° C. for 90 minutes. This resulted in a stable dispersion having 19.3% solids.

III. Evaluation of Films

Qualitative evaluation of films prepared from the sulfonated polyurethane urea dispersions were made. Films of the sulfonated polyurethane ureas were prepared by placing approximately 15 ml of the sulfonated polyurethane urea dispersions (Examples 1–13 and Comparative Examples 1–6) in small aluminum pans. The dispersions were air dried at room temperature overnight to form films in the bottom of the pans. The tack of the inventive films was qualitatively assessed by a "finger appeal" test involving a light touch and short contact time at room temperature, and assigned a value of 1 through 5, where 1=tack free, 1.25=very, very, low tack, 1.5=very low tack, 2=low tack, 2.5=low-to-medium tack, 3=medium tack, 3.5=medium-to-good tack, 4=good tack, and 5=excellent tack. On this scale, Scotch™ Magic™ transparent tape from Minnesota Mining and Manufacturing Co. (3M), St. Paul, Minn., USA has a rating of 5.

The films were also evaluated for self-adhesion at room temperature (about 20° to 30° C.) by removing films from the pan and lightly folding the films over onto themselves without applying pressure or force. Films evaluated as having self-adherence would immediately stick to themselves and not unfold.

The results are shown in Table II below:

TABLE II

| Example | Tack | Self Adherence |
|---|---|---|
| 1 | 1 | Yes |
| 2 | 1 | Yes |
| 3 | 1 | Yes |
| 4 | 1 | Yes |
| 5 | 1.5 | Yes |
| 6 | 1.5 | Yes |
| 7 | 1 | Yes |
| 8 | 1 | Yes |
| 9 | 1 | Yes |
| 10 | 1.5 | Yes |
| 11 | 1 | Yes |
| 12 | 1 | Yes |
| 13 | 2 | Yes |
| Comparative 1 | 1 | No |
| Comparative 2 | 1 | No |
| Comparative 3 | 1 | No |
| Comparative 4 | 1 | No |
| Comparative 5 | 5 | Yes |
| Comparative 6 | 1 | No |

IV. Cosmetic Examples

Example 14

A body lotion suitable for use as a waterproof sunscreen or insect repellent with added active ingredients was prepared. An oil-in-water emulsion was prepared using the specific components and amounts in weight percent for Phase A and Phase B listed in Table III. Phase A and Phase B were heated to 70° C. with continuous stirring in separate vessels. Phase B was added to Phase A and homogenized using a high shear mixer. Cooling to room temperature with slight agitation yields a moderate viscosity cream.

TABLE III

Oil-in-water emulsion for body lotion

| Component | Amount (weight percent) |
|---|---|
| Phase A | |
| Mineral oil | 10.0 |
| Isopropyl myristate | 2.0 |
| Stearic acid | 4.0 |
| Glycerol stearate | 3.0 |
| Ceteth-20 | 1.0 |
| Lanolin oil | 0.6 |
| Phase B | |
| Deionized water | 76.8 |
| Dispersion from Example 2 | 2.4 |
| Hydroxyethyl cellulose | 0.2 |
| Triethanolamine | 1.2 |

Example 15

An oil in water emulsion for mascara was prepared using the specific components and amounts in weight percent for Phase A and Phase B listed in Table IV. Phase A and Phase B were heated to 90° C. with continuous stirring in separate vessels. Phase B was added to Phase A and homogenized using a high shear mixer. After cooling, the resulting paste provides a flake-, smudge-, and water-resistant mascara.

TABLE IV

Oil-in-water emulsion for mascara

| Component | Amount (weight percent) |
|---|---|
| Phase A | |
| Carnuba wax | 10.0 |
| Isopropyl myristate | 6.0 |
| Stearic acid | 5.0 |
| Glycerol stearate | 3.0 |
| Black iron oxide pigment | 10.0 |
| Phase B | |
| Deionized water | 57.5 |
| Dispersion from Example 1 | 6.0 |
| Polyvinylpyrrolidone | 1.0 |
| Hydroxyethyl cellulose | 0.2 |
| Triethanolamine | 1.3 |

Example 16

A conditioning shampoo was prepared by charging 10.7 wt % ammonium lauryl sulfate (28% solids), 40.0 wt % ammonium laureth-2-sulfate (25% solids), 2.0 wt % ethylene glycol distearate, 1.0 wt % cocamide MEA, 0.5 wt % tricetylmethylammonium chloride, 0.2 wt % cetyl alcohol and 0.1 wt % stearyl alcohol into a vessel. The resulting mixture was heated to 80° C. with stirring and a mixture containing 5.0 wt % of the dispersion of Example 1 in 45.4 wt % of deionized water was added. After cooling, the resulting pearly liquid provides a shampoo with good wet combability after rinsing and fast drying.

Example 17

A clear nail lacquer was made as follows: About 20 parts of a 20% solids ethanol solution of an acrylate grafted silicone copolymer available from 3M Corporation, St. Paul, Minn. under the trade designation VS 80 Silicones Plus copolymer was combined with 10 parts of the dispersion solution from Example 2. This provided a fast drying clear nail lacquer with good chip resistance and gloss.

Various modifications and alterations to this invention will become apparent to those skilled in the art without departing from the scope and spirit of this invention. It should be understood that this invention is not intended to be unduly limited by the illustrative embodiments and examples set forth herein and that such examples and embodiments are presented by way of example only with the scope of the invention intended to be limited only by the claims as set forth herein as follows.

What is claimed is:

1. A composition comprising a sulfonated polyurethane urea comprising the reaction product of:
   (a) one or more sulfonated polyols;
   (b) one or more non-sulfonated polyols selected from the group consisting of polyether polyols, polyester polyols, polycaprolactone polyols, and mixtures thereof;
   (c) one or more aliphatic polyisocyanates, having 2 to 25 carbon atoms, or cycloaliphatic polyisocyanates, having 3 to 25 carbon atoms; and
   (d) excess water, wherein:
      the sulfonated polyurethane urea has been chain-extended with water;
      the reaction product of (a), (b), and (c) has an isocyanate to hydroxyl ratio of 1.3:1 to 2.5:1; and
      the reaction product of (a), (b), (c) with (d) has a sulfonate equivalent weight of from about 1000 to about 8500 and comprises a polyurea segment of the following formula:

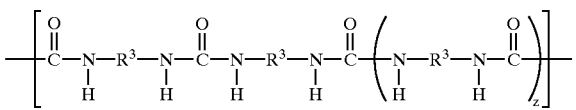

wherein z is an integer from 1 to 6 and $R^3$ is an aliphatic group, having 2 to 25 carbon atoms, or a cycloaliphatic group, having 3 to 25 carbon atoms, derived from the aliphatic or cycloaliphatic polyisocyanate.

2. The sulfonated polyurethane urea composition according to claim 1 wherein the reaction product of (a), (b), and (c) has an isocyanate to hydroxyl ratio of about 1.65:1 to 1.85:1.

3. The sulfonated polyurethane urea composition according to claim 1 wherein the reaction product of (a), (b) and (c) with (d) has a sulfonate equivalent weight of from about 3000 to about 6000.

4. The sulfonated polyurethane urea composition according to claim 1, wherein the sulfonated polyol comprises the reaction product of:

(a) dimethyl-5-sodiosulfoisophthalate or 5-sodiosulfoisophthalic acid and (b) one or more polyols.

5. The sulfonated polyurethane urea composition according to claim 1, wherein the sulfonated polyol comprises the reaction product of:
   (a) dimethyl-5-sodiosulfoisophthalate or 5-sodiosulfoisophthalic acid and
   (b) one or more polyols selected from the group consisting of polyether polyols, polyester polyols, polycaprolactone polyols, and mixtures thereof.

6. The sulfonated polyurethane urea composition according to claim 1, wherein the sulfonated polyol comprises the reaction product of:
   (a) dimethyl-5-sodiosulfoisophthalate or 5-sodiosulfoisophthalic acid and
   (b) one or more polyols selected from the group consisting of polyethylene glycol-600, polyethylene glycol-400, polypropylene glycol-425, polyethylene glycol-300, polyethylene glycol-200, and mixtures thereof.

7. The sulfonated polyurethane urea composition according to claim 1, wherein the one or more non-sulfonated polyols are selected from the group consisting of diethylene glycol/adipic acid polyester polyol; neopentyl glycol, 1,6-hexanediol, isophthalate, adipate polyester polyol; polyethylene glycols; polycaprolactone diol; polypropylene glycols; and mixtures thereof.

8. The sulfonated polyurethane urea composition according to claim 1, wherein the aliphatic or cycloaliphatic polyisocyanate is a diisocyanate.

9. The sulfonated polyurethane urea composition according to claim 8, wherein the diisocyanate is selected from the group consisting of isophorone diisocyanate, bis(4-isocyanatocyclohexyl)methane, tri-methyl-1,6-diisocyanatohexane, and mixtures thereof.

10. A composition comprising a colloidal dispersion comprising the sulfonated polyurethane urea according to claim 1.

11. The colloidal dispersion according to claim 10, wherein the dispersion is aqueous.

12. The colloidal dispersion according to claim 10, wherein the dispersion is a water and alcohol mixture.

13. The colloidal dispersion according to claim 10, wherein the dispersion comprises less than 50% solids.

14. The dispersion of claim 10 used in a cosmetic application selected from the group consisting of mascara, foundation, rouge, face powder, eyeliner, eyeshadow, lipstick, insect repellent, nail polish, skin moisturizer, skin cream, body lotion, and sunscreen.

15. The dispersion of claim 10 used in a hair care composition selected from the group consisting of shampoos, conditioners, hair sprays, mousses, and gels, wherein said hair care composition is not a reshapable hair care composition.

16. A film prepared from a colloidal dispersion comprising a sulfonated polyurethane urea comprising the reaction product of:
   (a) one or more sulfonated polyols;
   (b) one or more non-sulfonated polyols selected from the group consisting of polyether polyols, polyester polyols, polycaprolactone polyols, and mixtures thereof;
   (c) one or more aliphatic polyisocyanates, having 2 to 25 carbon atoms, or cycloaliphatic polyisocyanates, having 3 to 25 carbon atoms; and
   (d) excess water, wherein:
      the sulfonated polyurethane urea has been chain-extended with water;
      the reaction product of (a), (b), and (c) has an isocyanate to hydroxyl ratio of 1.3:1 to 2.5:1;
      the reaction product of (a), (b), and (c) with (d) ) has a sulfonate equivalent weight of from about 1000 to about 8500 and comprises a polyurea segment of the following formula:

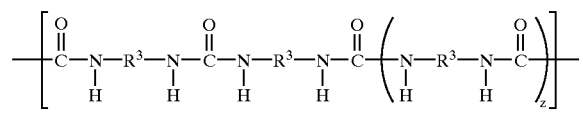

wherein z is an integer from 1 to 6 and $R^3$ is an aliphatic group, having 2 to 25 carbon atoms, or a cycloaliphatic group, having 3 to 25 carbon atoms, derived from the aliphatic or cycloaliphatic polyisocyanate; and
   wherein said excess water is removed.

17. The film according to claim 16 wherein the reaction product of (a), (b), and (c) has an isocyanate to hydroxyl ratio of about 1.65:1 to 1.85:1.

18. The film according to claim 16 wherein the reaction product of (a), (b) and (c) with (d) has a sulfonate equivalent weight of from about 3000 to about 6000.

19. The film according to claim 16, wherein the film is self-adhesive and minimally tacky.

20. The film according to claim 16, wherein the film is redispersible in water.

21. The film according to claim 16, wherein the film is coated on a substrate.

22. The film according to claim 21, wherein said substrate material is selected from the group consisting of paper, polypropylene, polyethylene, polyvinyl chloride, polyester, cellulose acetate, ethyl cellulose, cellulose triacetate, woven fabric, non-woven fabric air-laid webs, metal, metallized polymeric film, ceramic sheet material, and fibrous substrates.

23. The film according to claim 16, wherein the film is coated on a substrate to form a tape.

* * * * *

UNITED STATES PATENT AND TRADEMARK OFFICE
CERTIFICATE OF CORRECTION

PATENT NO. : 6,649,727 B1
APPLICATION NO. : 09/626812
DATED : November 18, 2003
INVENTOR(S) : Jeffrey T. Anderson It is certified that error appears in the above-identified patent and that said Letters Patent is hereby corrected as shown below:

Column 8
Line 60, Delete "($H_2N$-$NH_2$)" and insert -- ($H_2N$—$NH_2$), --, therefore.

Column 16
Line 54, Delete "fall" and insert -- full --, therefor.
Line 56, Delete "Isonate#" and insert -- Isonate$^{TM}$ --, therefore.

Signed and Sealed this

Thirty-first Day of July, 2007

JON W. DUDAS
*Director of the United States Patent and Trademark Office*